United States Patent Office 3,316,952
Patented May 2, 1967

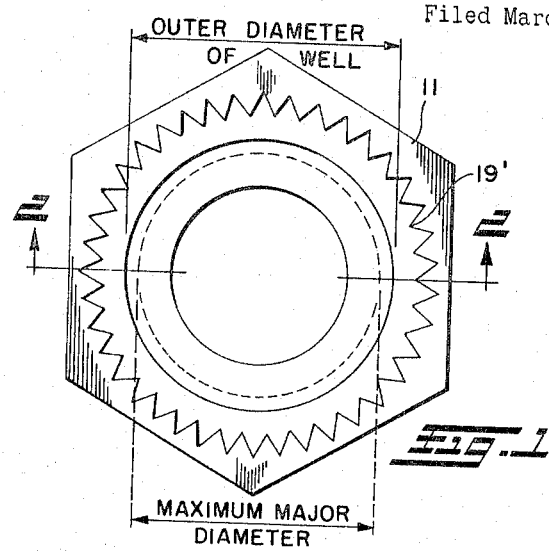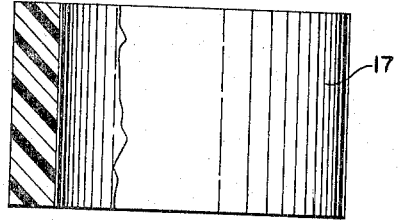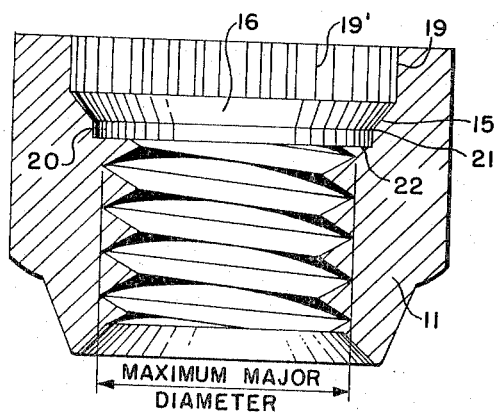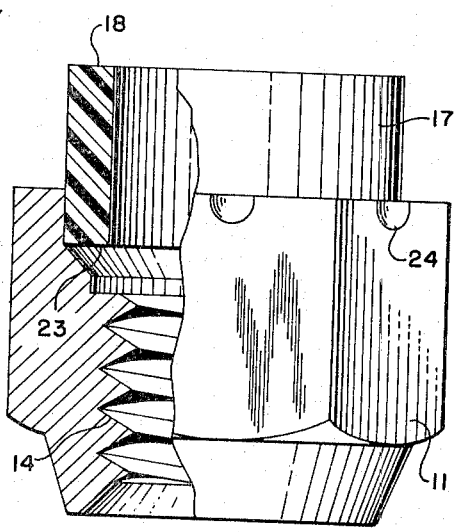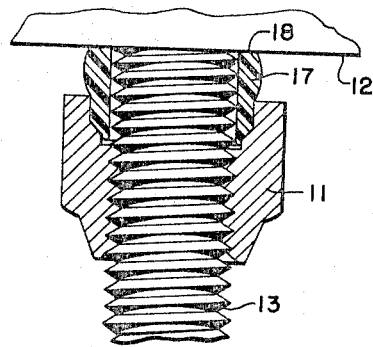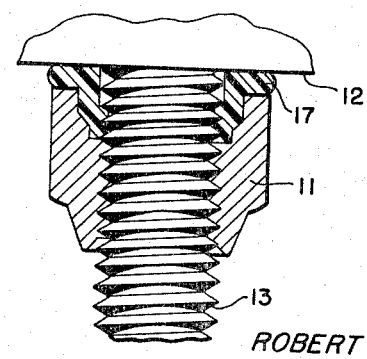

3,316,952
SEALING LOCK NUT
Robert F. Hollinger, Massillon, Ohio, assignor to Eaton Yale & Towne Inc., Cleveland, Ohio, a corporation of Ohio
Filed Mar. 14, 1966, Ser. No. 533,984
8 Claims. (Cl. 151—7)

This application is a continuation-in-part of my co-pending application Ser. No. 284,085 filed May 29, 1963 (now abandoned).

The invention relates to a sealing lock nut having a cavity in one end, in which is disposed a deformable insert that not only secures the assembly to a work piece but also forms a vapor and fluid seal around the threads of a complementary threaded element.

In the past, two types of lock nuts having deformable inserts have been used. These previous lock nuts comprise the following two basic configurations:

(1) Lock nuts having a recess for receiving a deformable insert, wherein the bottom wall of the recess which extends from the outer lateral recess wall to the threaded bore is substantially flat or horizontal. In utilizing this prior art configuration, as the nut is tightened against a surface the insert is compressed between two substantially flat and parallel surfaces; therefore, only an axially applied force is employed to radially expand the deformable insert into the threads of a bolt. However, when the radial expanding insert contacts the crest of the threaded bolt, the thread crest exerts a substantially equal and opposite restraining force against the expanding insert and thus substantially resist the deformation of the insert into the threads adjacent the bottom wall of the recess. Moreover, as the insert is forced radially inwardly along the bottom wall of the recess, into the threads of a bolt, the bolt threads will act as an auger as they enter the complementary nut threads, whereby a shearing of the insert material results therefrom. It is thus readily apparent this shearing of the deformed insert material is very undesirable and is detrimental in the creation of an effective vapor and fluid seal extending 360° about the circumference of the bolt.

(2) Another type of prior art lock nut which is commonly used has a deformable insert in a recess with a bottom wall which is inclined from the outer lateral recess wall inwardly toward the geometric axis of the nut, thereby forming an inwardly sloping conical surface. Utilizing this configuration, an inwardly lateral component of force is exerted on the insert material as the nut is tightened. However, even employing this assembly the bolt threads as they enter the complementary nut threads shear the deformable insert material and such action prevents the creation of an effective seal.

An object of the present invention is concerned primarily with the provision of a new and improved sealing lock nut wherein the nut has a deformable insert disposed within a recess and with a well extending from the inner edge of the sloping conical bottom wall of the recess to a threaded opening in the nut. The purpose of the well is to relieve the magnitude of the lateral component of force which is exerted on the deformable insert when the nut is tightened against a surface; so that the insert material rolls or deforms into the well rather than being forced directly into the threads of a bolt. Thus, with the well disposed interjacent the inclined bottom wall of the recess and the threaded portion of a nut, there is created a rolling or bending action of the deformable insert, whereby there is substantially no shearing of the insert material by the bolt threads and a new and unobvious fluid seal is created.

Another object is to provide a sealing lock nut having improved fluid sealing properties and which is relatively easy to form by mass production techniques.

A better understanding of the invention will be afforded by the following detailed description considered in conjunction with the drawing, in which:

FIGURE 1 is a plan view of the fastener.

FIGURE 2 is a detailed sectional view taken along line 2—2 of FIGURE 1.

FIGURE 3 is an elevation partially in longitudinal section of an insert which may be employed in the fastener of FIGURES 1 and 2.

FIGURE 4 is an elevation partially in the section of an assembled sealing nut with the insert in place, but before the nut has been tightened down on the object to be fastened; and FIGURE 5 is a sectional view of the assembly during the initial tightening cycle.

FIGURE 6 is a sectional view of the assembly after the fastener assembly has been tightened.

In general, the objects of the present invention are met by providing an elongated fastener body with a recess or sink having an inwardly sloping bottom wall and a well extending from the inner edge of the bottom wall to the threaded bore of the fastener. Thus, when an axial force is impressed upon the deformable insert, which is positioned within the recess, the inwardly sloping bottom wall causes a lateral component of the axial force to move the insert material, disposed adjacent the bottom wall, toward a complementary threaded element or bolt. However, with the well disposed intermediate the annular inclined bottom wall and the threaded fastener bore, the magnitude of the lateral force component is relieved or relaxed in this area adjacent the threaded bore of the nut, whereby the material bends or rolls into the well and subsequently deforms or rolls into the V-shaped threads rather than being laterally forced directly into the threads of the bolt. Accordingly, when the deformable material reaches the edge of the recess or sink the material bends, rolls, or deforms into the well due to the removal of that portion of the annular conical bottom wall adjacent the threaded bore and as additional insert material bends or rolls or deforms into this well, some of the insert material will roll, bend or deform and completely fill the V-shaped threads of a threaded element to provide a locking action which prevents regressive rotation of the body member and simultaneously to effect a seal around the entire 360° circumferential area of the threaded element or bolt.

Referring to FIGURES 1–6 of the drawing, the sealing lock nut 11 is composed of a suitable material, such as steel or some material of sufficient strength for securement against a surface 12 by means of complementary threaded element 13 upon which the nut 11 is threadedly engaged by means of a conventional thread 14.

In order to circumferentially seal around the threads of threaded element 13 adjacent bottom wall or conical shoulder 15 of recess or sink 16, a deformable insert or washer 17 of suitable sealing material such as a resilient linear polymer plastic of the molecular chain type, for example, nylon, is provided. The recess 16 is formed in the nut 11 for receiving the hollow cylindrical insert 17 which may have an axial dimension greater than the axial dimension of the recess. The recess 16 has bottom wall 15 of conical shape so that as the nut 11 is tightened against the surface 12, the axial force which is applied against the exposed edge 18 of insert 17 is translated into a lateral component of force by the sloping wall 15, whereby the sealing material of insert 17 is forced radially inwardly toward the threads of the bolt, screw, or stud 13. It is apparent the cylindrical surface or lateral wall 19 cooperates with the bottom wall 15 to achieve this inward movement of the insert 17 by resisting outer radial expansion of insert 17.

To obtain the desired seal it is essential to provide a well 20 below the recess 16, with the well extending from the lower inner edge 21 of the annular bottom wall 15 to the internally threaded bore of nut 11. The bottom wall 22, of well 20, extends to the threaded bore of nut 11 and the inner-side of the well 20 is open substantially along the entire longitudinal axial length thereof. The well 20 as shown in FIGURE 2 has a greater outer diameter than the maximum major diameter of the threaded bore of nut 11 but a sufficiently smaller outer diameter than the outer diameter of recess 16 to leave a sloping conical bottom wall 15 in the recess 16.

In the preferred embodiment, the well 20 has an outer diameter having a range between a minimum of 105% and a maximum of 120% of the maximum major diameter of the threads of nut 11.

As the nut is tightened against the surface 12, the insert material 17 is forced radially inwardly by conical bottom wall 15. Upon reaching the edge 21 of recess 16 the insert material 17 rolls over edge 21 downwardly into the well. This action is caused by the expansion of the insert material 17, which is due to the pressure relief or release created by the well 20. Upon subsequent or final tightening of the nut 11 the insert material 17 will roll or deform into and substantially fill the V-shaped configurations of the threaded bolt. The ideal conditions are achieved when the insert material is deformed into the bolt threads during the last turn or a portion of the last turn of the nut prior to complete securement to surface 12.

To reiterate, when the deformable insert material reaches the edge 21 of the recess 16, the material bends, rolls, or deforms into the well 20 due to the removal of that portion of the annular bottom wall 15 adjacent the threaded bore of nut 11 and as material is deformed into the well 20 due to subsequent tightening of nut 11, a portion of the insert material will roll or deform laterally into the V-configuration of a threaded bolt to effect a locking and sealing action between the nut 11 and the threads of the bolt. In addition, there is substantially no shearing of the insert material as a result of the relative rotation between the nut 11 and the threads of a bolt. With this arrangement a continuous circumferential fluid seal is provided by the insert 17, between the well 20 and the threads of a bolt.

It is desirable to have the side wall surface 19 of recess 16 provided with longitudinally disposed grooves or serrations 19' or otherwise formed in such a manner that the outer surface of insert 17 is gripped and firmly held to prevent any relative rotation between the nut 11 and insert 17. If slippage occurs between the nut 11 and insert 17 during the tightening cycle of the nut 11, the insert 17 will be compressed into the threads of a threaded bolt and will remain locked to the threads during the loosening cycle of the nut, thereby preventing reuse of the insert. Thus, the insert 17 should turn with the nut 11 during both the tightening and loosening cycles of the nut 11.

Under some circumstances and for some applications, it may be found desirable to slope the bottom wall 15 of the recess 16 at an acute angle of 45° or greater; and flat end 23 of the insert which contacts bottom wall 15 may be inclined at a smaller angle than the bottom wall 15.

In order to retain the insert 17 and the nut 11 in their assembled relation while in stock or while being delivered and before the nut 11 has been threaded against the surface 12 to deform the insert 17 against the screw thread 13, the inserts may be staked in place as shown at 24.

The insert or washer 17 is composed of a substance of sufficient hardness and rigidity so that it will maintain its form when it is backed-off with the nut 11 and may be assembled with the nut 11 by automatic assembling machines.

After the nut 11 and the nylon insert 17 have been assembled and staked as indicated at 24, the nylon is plasticized or softened by soaking the assembly in a plasticizer such as ethylene glycol at a suitable temperature such as a temperature between 140° and 160° for a period of approximately two hours. This has been found to provide the properties needed to render the nylon workable and pliable.

Under certain conditions where cost is not a factor, sealing may be accomplished by means of inserts composed of such materials as polyurethane such as is sold under the trademark "Estane" or polyvinyl chloride.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

Having described my invention, I claim:

1. A locking and sealing nut comprising in combination:
   a metal nut having a threaded bore and having a sink therein substantially concentric with the threaded bore and having a longitudinal groove portion formed in a lateral cylindrical wall portion of said sink;
   and having a well adjacent the threaded bore with a cylindrical side surface also substantially concentric with the threaded bore and the sink and with a radial bottom surface extending from the side surface to the bore;
   the well being of a smaller outside diameter than the sink but of a larger outside diameter than the major diameter of the thread;
   the sink being formed with a sloping conical shoulder around the well extending between the well and said lateral sink wall;
   whereby the well is axially spaced from the lateral wall portion of the sink;
   the angle of said shoulder being of the order of 45° and a deformable insert of hollow cylindrical form having an axial dimension greater than the axial dimension from the end of the wall adjacent the conical shoulder to the outer end of the sink adapted to be received therein and to be compressed by said sloping shoulder upon tightening the nut against a surface;
   the insert being composed of material having less compressive strength than the nut and having an end surface adapted to engage the sloping surface of said nut and having a lesser angle than the angle of the shoulder of the sink measured from a plane perpendicular to the axis of the insert;
   and means for securing the insert in said sink.

2. The locking and sealing nut of claim 1, wherein the insert is composed of a pliable, synthetic, softened plastic material.

3. The locking and sealing nut of claim 1 wherein the insert is composed of a material having the properties of nylon.

4. A fastener device comprising, in combination:
   an elongate body member having a bore therein, with one end portion of the bore having a smaller cross-sectional area than the other end portion;
   an annular conical surface disposed intermediate the different cross-sectional area portions of the body member;
   the smaller end portion of the bore being internally threaded,
   the annular conical surface sloping in a direction away from the outer edge of the other end portion, part way toward the internally threaded one end of the bore;
   the body member having a well which extends from an inner edge of said annular conical surface to the internally threaded bore directly adjacent the threads thereof;

the well having a cylindrical side surface and a radial bottom wall extending to the bore, with the well being open along the entire axial length thereof;

the well being of a smaller outer diameter than the bore of the other end portion but of a larger outer diameter than the maximum major diameter of the internally threaded one end portion;

a deformable tubular-shaped washer of less compressive strength than the body member being disposed in the larger cross-sectional area of the other end portion of the bore in the body member, the axial dimension of the washer being greater than the axial dimension from the end of the wall adjacent the conical surface to the outer end of the larger bore portion;

the washer being deformed upon threading engagement of the internally threaded one end portion of the body member with cooperating threads of an externally threaded element as the body member is tightened against a working surface, and a portion of the washer being urged into the well and into the threads of the externally threaded element to effectively seal and lock the fastener device.

5. The fastener device of claim 4 wherein the outer diameter of the well has a range between a minimum of 105% and a maximum of 120% of the maximum major diameter of the internally threaded one end portion.

6. The fastener device of claim 4 wherein the one end of the washer which engages the sloping annular conical surface has a lesser angle than the angle of the sloping annular conical surface of the body member measured from a plane perpendicular to the longitudinal axis of the washer.

7. The fastener device of claim 5 having a means for preventing rotation of the insert relative to the body member as the nut is being tightened against a surface.

8. The fastener device of claim 7 wherein the means for preventing rotation of the insert includes:
serrations disposed on the surface of the other end portion of the bore.

References Cited by the Examiner
UNITED STATES PATENTS

| | | | |
|---|---|---|---|
| 1,016,746 | 2/1912 | Herzog | 151—14.5 |
| 2,320,032 | 5/1943 | Danforth | 151—7 |
| 2,343,235 | 2/1944 | Bashark. | |
| 2,394,097 | 2/1946 | Parker | 285—220 |
| 2,502,642 | 4/1950 | Currlin | 151—7 |
| 3,003,795 | 10/1961 | Lyon | 285—212 |
| 3,040,796 | 6/1962 | Gouverneur | 151—7 |
| 3,042,248 | 7/1962 | Krueger | 285—212 |
| 3,106,413 | 10/1963 | Hamlin et al. | 285—212 |
| 3,212,796 | 10/1965 | Neuschotz | 285—158 |

CARL W. TOMLIN, *Primary Examiner.*

G. A. MILWICK, R. S. BRITTS, *Assistant Examiners.*